US009402008B2

(12) United States Patent
Chen et al.

(10) Patent No.: US 9,402,008 B2
(45) Date of Patent: Jul. 26, 2016

(54) MULTI-MODE SCANNER

(71) Applicant: AVISION INC., Hsinchu (TW)

(72) Inventors: Chi-Yao Chen, Nanjhuang Township, Miaoli County (TW); Chao Yu Peng, Hsinchu (TW)

(73) Assignee: Avision Inc. (TW)

( * ) Notice: Subject to any disclaimer, the term of this patent is extended or adjusted under 35 U.S.C. 154(b) by 0 days.

(21) Appl. No.: 14/953,249

(22) Filed: Nov. 27, 2015

(65) Prior Publication Data

US 2016/0080598 A1 Mar. 17, 2016

Related U.S. Application Data

(63) Continuation-in-part of application No. 14/263,209, filed on Apr. 28, 2014, now Pat. No. 9,247,097.

(30) Foreign Application Priority Data

Mar. 10, 2014 (TW) .............................. 103108068 A
Dec. 31, 2014 (TW) .............................. 103146441 A

(51) Int. Cl.
*H04N 1/04* (2006.01)
*H04N 1/00* (2006.01)
*H04N 1/028* (2006.01)
*H04N 1/12* (2006.01)
*H04N 1/203* (2006.01)

(52) U.S. Cl.
CPC ....... *H04N 1/00827* (2013.01); *H04N 1/00525* (2013.01); *H04N 1/00716* (2013.01); *H04N 1/02815* (2013.01); *H04N 1/121* (2013.01); *H04N 1/123* (2013.01); *H04N 1/2032* (2013.01); *H04N 1/2036* (2013.01); *H04N 1/2038* (2013.01); *H04N 2201/0094* (2013.01); *H04N 2201/0434* (2013.01)

(58) Field of Classification Search
CPC .......... H04N 1/00827; H04N 1/00716; H04N 1/02815; H04N 1/123; H04N 1/2036; H04N 1/00525
USPC .................................. 358/488, 474, 498, 497
See application file for complete search history.

(56) References Cited

U.S. PATENT DOCUMENTS 3,395,610 A * 8/1968 Evans .................. G03G 15/041
355/28
6,580,526 B1 6/2003 Suzuki et al.
(Continued)

FOREIGN PATENT DOCUMENTS

CN 1921541 A 2/2007
CN 201374758 Y 12/2009
TW 200841700 A 10/2008
(Continued)

*Primary Examiner* — Houshang Safaipour

(57) ABSTRACT

A multi-mode scanner comprises a first body, a second body and a scanning module. The first body connected to the second body has connected first and second sides. A passageway accommodating a first portion of a bent document is formed between the first and second bodies. A second portion of the bent document is connected to the first portion of the bent document and supported by a second side of the first body. The first and second bodies are configured such that a weight of the bent document makes the second portion be in flat surface contact with the second side, or makes the first portion be in flat surface contact with first side. The scanning module disposed in one or both of the first and second bodies performs an image scan operation on the first portion of the bent document in the passageway to obtain an image signal.

12 Claims, 18 Drawing Sheets

(56) References Cited

U.S. PATENT DOCUMENTS

| | | | |
|---|---|---|---|
| 7,551,332 B2 * | 6/2009 | Itoi | H04N 1/1017 355/25 |
| 7,636,182 B2 | 12/2009 | Guo | |
| 7,843,611 B2 | 11/2010 | Albahri | |

FOREIGN PATENT DOCUMENTS

| | | |
|---|---|---|
| TW | 200926757 A | 6/2009 |
| TW | M381972 U1 | 6/2010 |
| TW | 201117601 A1 | 5/2011 |
| TW | M201116040 A1 | 5/2011 |

* cited by examiner

MULTI-MODE SCANNER

This application is a Continuation-in-Part of co-pending application Ser. No. 14/263,209, filed on Apr. 28, 2014, and claims priority of No. 103146441 filed in Taiwan R.O.C. on Dec. 31, 2014 under 35 USC 119, the entire content of which is hereby incorporated by reference.

BACKGROUND OF THE INVENTION

1. Field of the Invention

The present invention relates to a scanner, and more particularly to a multi-mode scanner capable of scanning one single side or both sides of an ordinary document and a bound document (or even any bent document).

2. Related Art

In general, when a bound document, such as a passport, book or the like, is to be scanned, the bound document cannot be transported past a sheet-fed scanner because the left and right sides of the bound document have different thicknesses, or due to the book back or binding mode. So, a flatbed scanner must be utilized to acquire the document image. However, the drawback of the flatbed scanner is that the flatbed scanner cannot scan both sides of the bound document at the same time. So, the user has to turn over the bound document to re-scan the document, and this is time-consuming and not user friendly.

On the other hand, credentials, such as passports and identification cards, often have to be scanned at the government organization, such as customhouse, for the immigration registration. If the flatbed scanner for scanning the passport is used to scan both sides of the credential, two scan operations have to be performed. If the sheet-fed scanner is to be purchased in order to scan the credential quickly, the cost is high and the sheet-fed scanner occupies an additional space, which is disadvantageous to the limited office environment.

Furthermore, if many diversified authentication functions corresponding to fingerprint, chip and radio frequency identification can be integrated into the scanner, then the scanner can operate in more modes to satisfy more requirements.

SUMMARY OF THE INVENTION

Accordingly, the present invention has been proposed to solve the problems of the prior art, and it is an object of the present invention to provide a multi-mode scanner capable of performing a simplex scan or even a duplex scan on a bound document (or even any other angled document) and an ordinary document to establish a convenient, rapid and user friendly scan environment, save the cost for purchasing different types of scanners, save the cost and provide multiple functions.

To achieve the above-identified object, the invention provides a multi-mode scanner comprising a first body, a second body and a scanning module. The first body has a first side and a second side connected together. The second body is connected to the first body. A passageway for accommodating a first portion of a bent document is formed between the first body and the second body. A second portion of the bent document is connected to the first portion of the bent document and is supported by the second side of the first body. The first body and the second body are configured such that a weight of the bent document makes the second portion be in flat surface contact with the second side, or makes the first portion be in flat surface contact with the first side. The scanning module is disposed in one or both of the first body and the second body and performs an image scan operation on the first portion of the bent document in the passageway to obtain an image signal or image signals.

The multi-mode scanner may further comprise a radio frequency identification reader, a fingerprint sensor and a card reader for providing the security function, the identification function and the data storage function.

With the multi-mode scanner according to the embodiment of the present invention, which is different from the frequently seen flatbed scanner and sheet-fed scanner, either the bent document or the ordinary document can be automatically transported and scanned (simplex and duplex scans can be performed). So, the operation becomes easy, timesaving, laborsaving and user friendly. In addition, the fingerprint identification, radio frequency identification and chip card reading functions are obtained. Furthermore, the cost of purchasing different types of electronic devices can be saved, the space can be saved, and the objects of the multi-mode operation, the security function, the identification and the data storage can be achieved.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

The present invention will be apparent from the following detailed description, which proceeds with reference to the accompanying drawings.

The multi-mode scanner according to each embodiment of the present invention may be a flatbed scanner, a sheet-fed scanner or a combination of the flatbed scanner and the sheet-fed scanner. In addition, the multi-mode scanner may be a simplex scanner or a duplex scanner. Furthermore, the multi-mode scanner may be a visible light scanner, an ultra-violet light scanner, an infrared scanner or a combination thereof. Thus, various elements described in the following can be applied to the embodiments when no conflict occurs.

Figure 1:
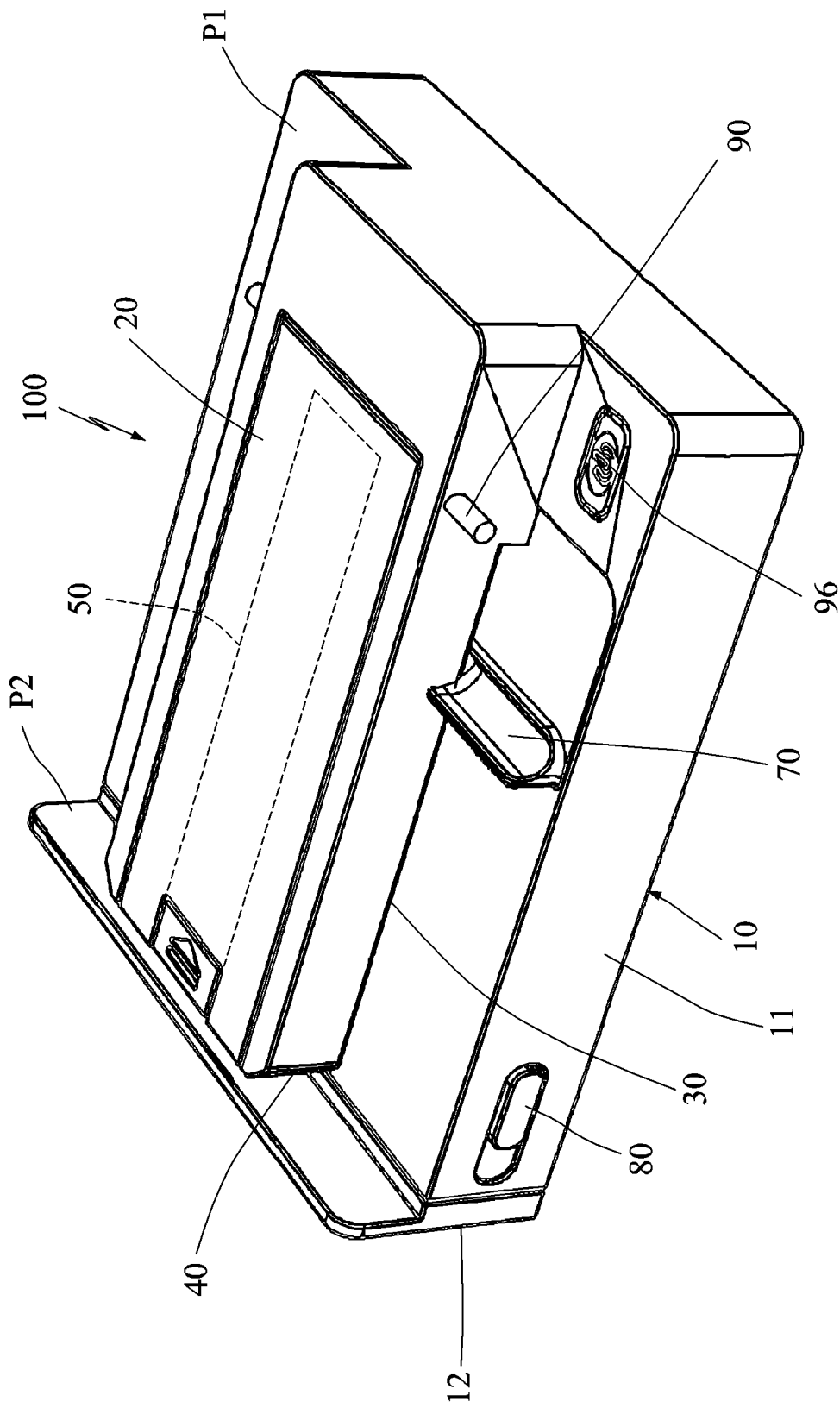
FIG. 1 shows a pictorial view of a multi-mode scanner according to a first embodiment of the present invention.
Figure 2:
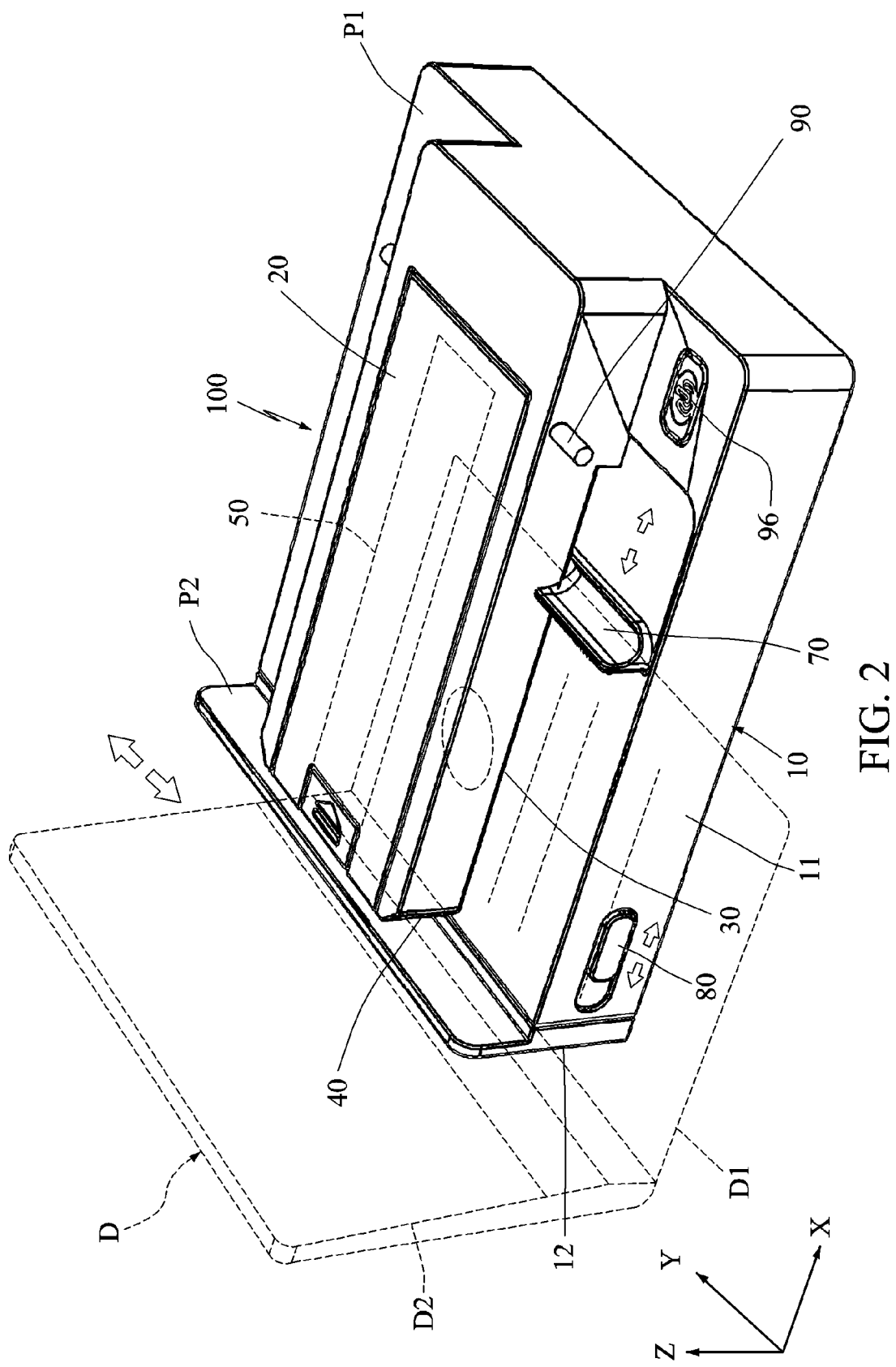
FIG. 2 shows a pictorial view of a using state of the multi-mode scanner according to the first embodiment of the present invention.
Figure 3:
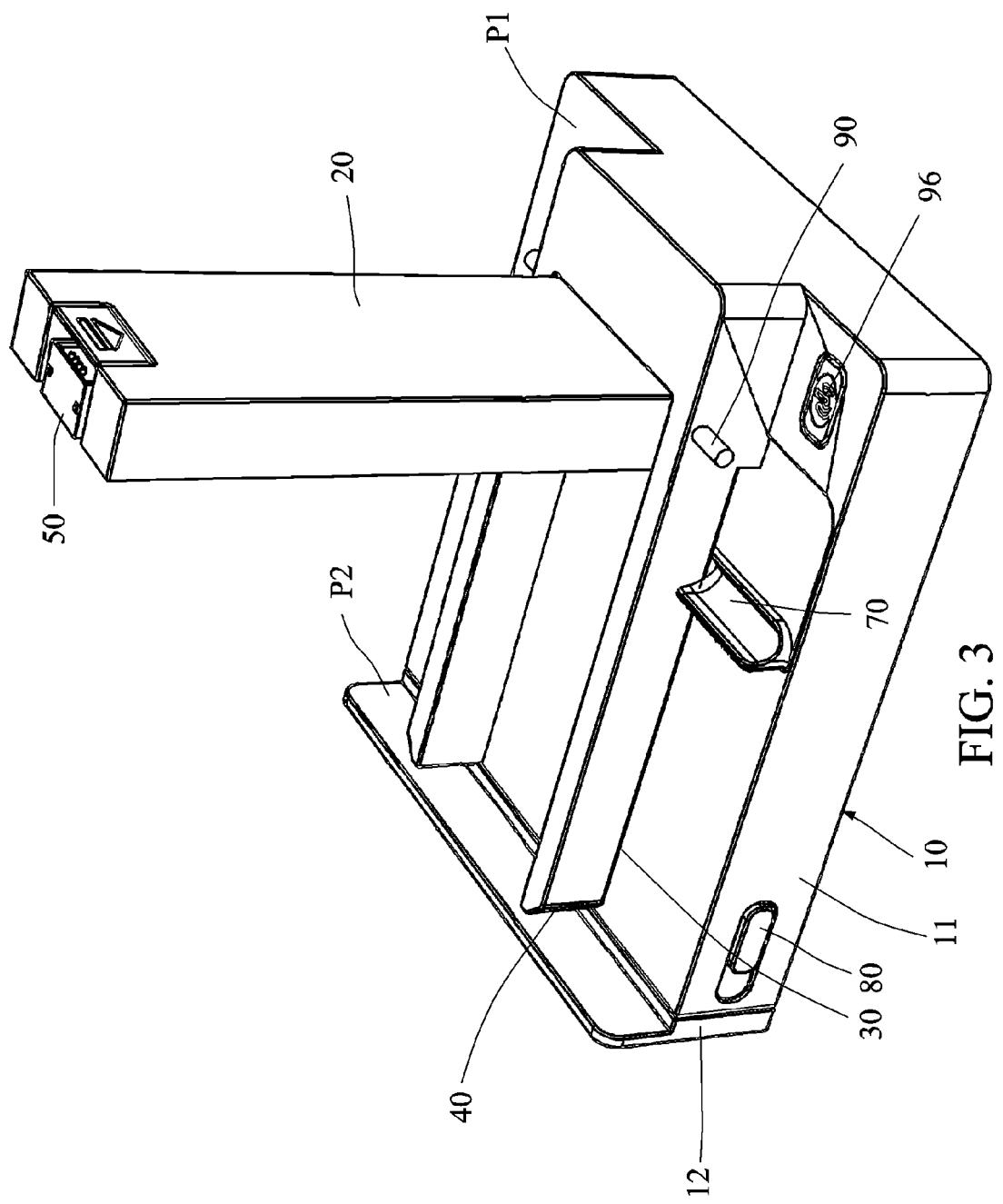
FIG. 3 shows a pictorial view of a maintaining state of the multi-mode scanner according to the first embodiment of the present invention.
Figure 4:
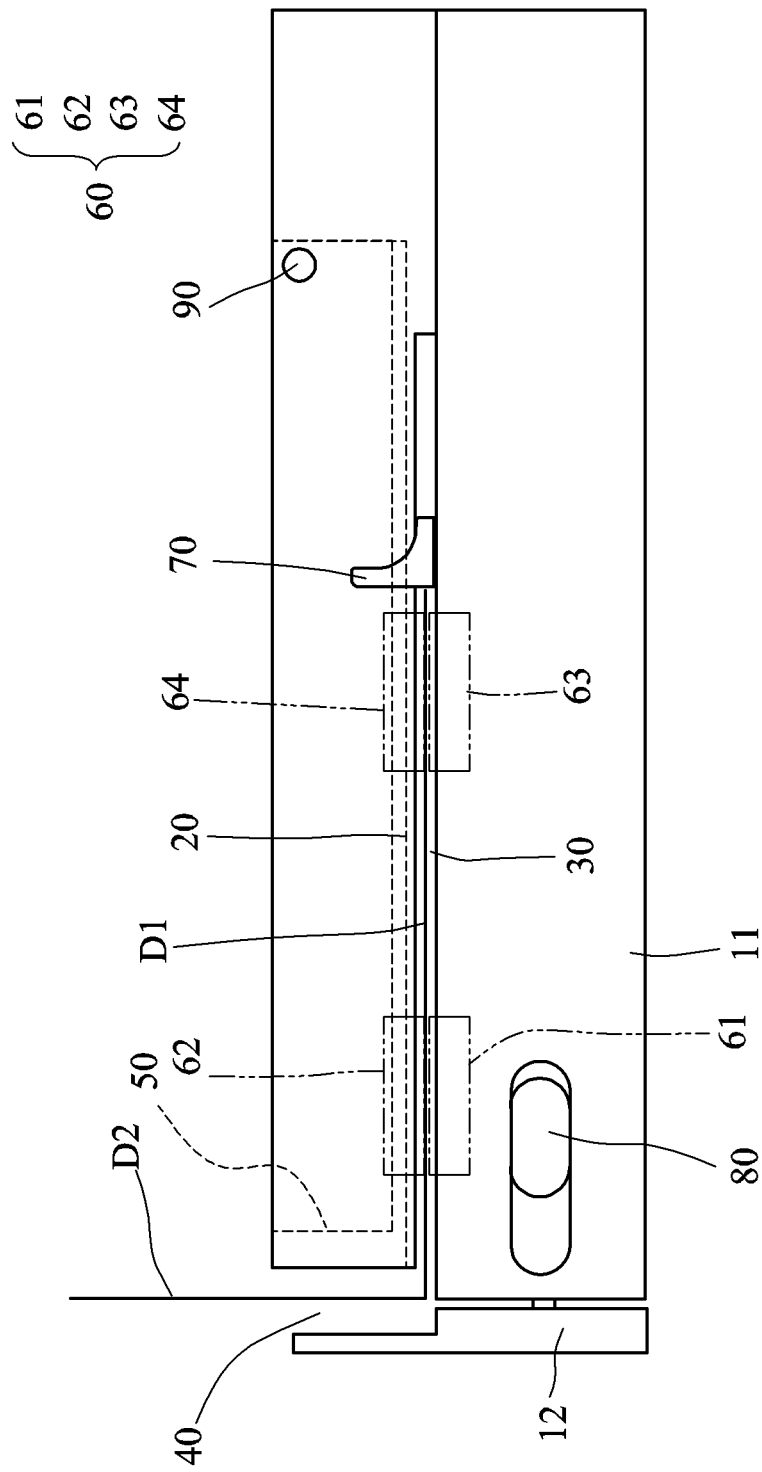
FIG. 4 shows a schematic side view of the multi-mode scanner according to the first embodiment of the present invention.

FIG. 1 shows a pictorial view of a multi-mode scanner 100 according to a first embodiment of the present invention. FIGS. 2 and 3 show pictorial views of a using state and a maintaining state of the multi-mode scanner 100 according to the first embodiment of the present invention, wherein FIG. 2 shows coordinate axes X, Y and Z. FIG. 4 shows a schematic side view of the multi-mode scanner 100 according to the first embodiment of the present invention. Referring to FIGS. 1 to 4, the multi-mode scanner 100 of this embodiment comprises a first body 10, a second body 20 and a scanning module 50. In addition, the multi-mode scanner 100 may further comprise a transporting mechanism 60, a width-adjustable guide plate 70, a thickness adjusting mechanism 80 and a pivotally connecting mechanism 90.

The second body 20 is disposed on the first body 10. A first passageway 30 and a second passageway 40, which are for accommodating a first portion D1 and a second portion D2 of an angled document D, respectively, are formed between the first body 10 and the second body 20. The first passageway 30 and the second passageway 40 are disposed on a first plane P1 and a second plane P2, respectively. An included angle between the first plane P1 and the second plane P2 ranges from 10 to 180 degrees. In this non-restrictive embodiment, the included angle is about 90 degrees, the first plane P1 is parallel to the XY plane, and the second plane P2 is parallel to the YZ plane. The included angle ranges from 10 to 170 degrees in another example, and ranges from 20 to 160 degrees in still another example.

The angled document D is transported past the scanning module 50 in the Y direction, and the main to-be-scanned surface (the surface with texts or patterns) of the angled document D faces upwards. The first passageway 30 positions the angled document D, and the second passageway 40 allows the angled document D to partially accommodate therein or allows the angled document D to move therein, or even can assist in positioning the angled document D. The angled document D comprises, without limitation to, a bound document, a bent card, or the like.

In this embodiment, the scanning module 50 is disposed in the second body 20. However, it is to be noted that in another embodiment of the present invention, the scanning module 50 may be disposed in the second body 20 and the first body 10, or may be solely disposed in the first body 10. Therefore, the scanning module 50 is disposed in the first body 10 and/or the second body 20, and performs an image scan operation on the first portion D1 of the angled document D in the first passageway 30 to obtain an image signal. In this embodiment, the scanning module 50 is disposed in the second body 20 and downwardly scans the first portion D1 of the angled document D. Furthermore, the scanning module 50 may be configured as a cantilever-arm type floating structure capable of floating up and down relatively to the second body 20 or the first body 10 to adaptively adjust the height of the first passageway 30 corresponding to the thickness of the first portion D1 of the angled document D. In the design of the cantilever-arm type floating structure, a spring may be used to push the scanning module 50 downwards, and the weight of the scanning module 50 may cause the scanning module 50 to press against the document. The scanning module 50 may be a charge-coupled device (CCD) type image sensor scanning module, or a contact image sensor (CIS) scanning module.

The first body 10 is usually a base or a casing, in which the necessary mechanisms, driving members, electrical elements and the like are disposed. For example, a button 96 is disposed on the first body 10, and the user can press the button 96 to perform the scan operation. In another example, a touch screen (not shown) is disposed on the first body 10 to provide display and input functions for the user.

In this embodiment, the first body 10 comprises a first portion 11 and a second portion 12. The first portion 11 and the second portion 12 are retractable relative to each other. The thickness adjusting mechanism 80 is connected to the first portion 11 and the second portion 12 of the first body 10, and can adjust the thickness of the second passageway 40 to fit with the thickness of the second portion D2 of the angled document D.

The transporting mechanism 60 is disposed in the first body 10 and the second body 20, and is for transporting the angled document D past the first passageway 30. In this embodiment, rollers 61, 62, 63 and 64 function as the transporting mechanism 60.

The width-adjustable guide plate 70 is connected to the first passageway 30 and pushes the first portion D1 of the angled document D toward the second passageway 40 to prevent the skew of the angled document D.

The pivotally connecting mechanism 90 pivotally connects the second body 20 to the first body 10. The scanning module 50 is disposed in the second body 20. Thus, as shown in FIG. 3, when the second body 20 is lifted up, the scanning module 50 is also lifted up therewith, and the user can perform the clean or maintenance operations on the scanning module 50 advantageously. Moreover, the user can replace the scanning module 50 with another scanning module for a different scan requirement, such as the high resolution scan, low resolution scan, monochromatic scan, color scan or the like.

Figure 5:
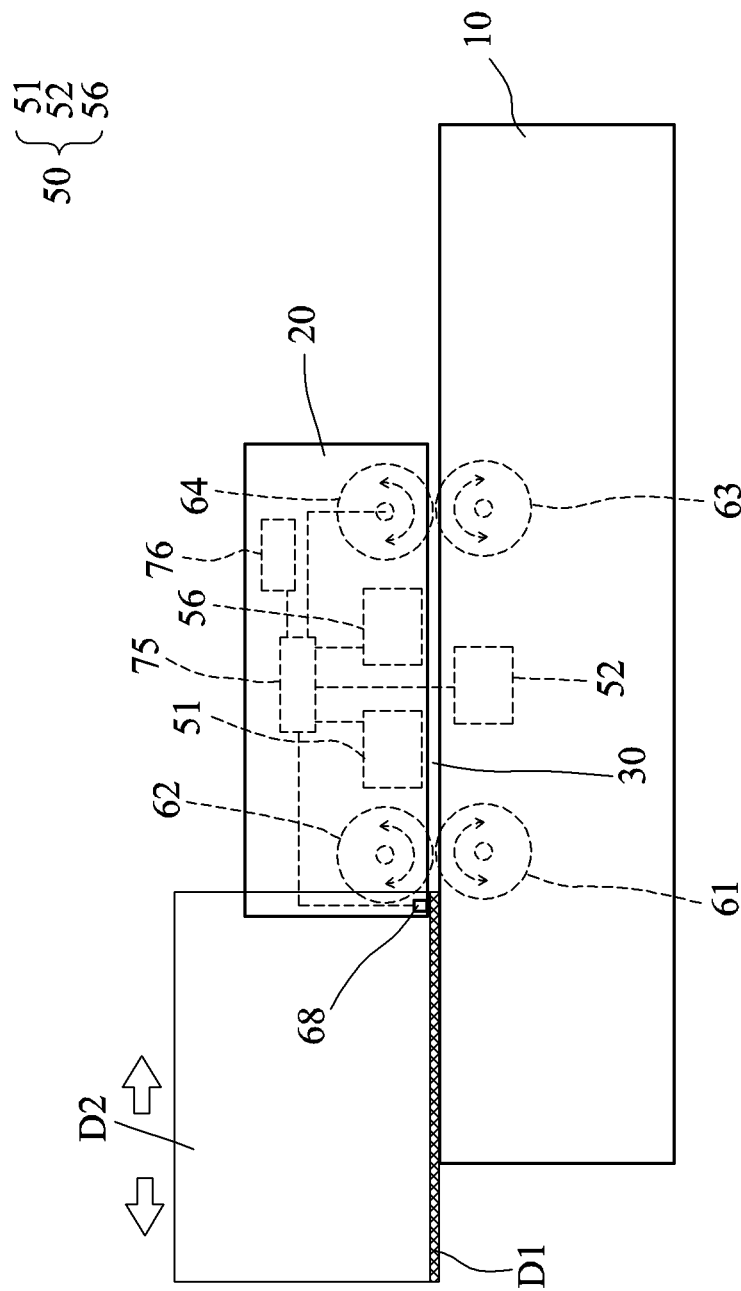
FIG. 5 shows a schematic from view of a multi-mode scanner according to a second embodiment of the present invention.

FIG. 5 shows a schematic from view of a multi-mode scanner according to a second embodiment of the present invention. Referring to FIG. 5, the scanning module 50 comprises a first scanning unit 51, a second scanning unit 52 and a third scanning unit 56. The first scanning unit 51 and the second scanning unit 52 are disposed in the second body 20 and the first body 10, and downwardly and upwardly scan the front side and the back side of the first portion D1 of the angled document D, respectively. The first scanning unit 51 and the second scanning unit 52 are visible light scanning units. The third scanning unit 56 is an infrared or ultra-violet light scanning unit. The first scanning unit 51 and the third scanning unit 56 downwardly scan the first portion D1 of the angled document D to obtain a visible light image and an infrared or ultra-violet light image.

In addition, the multi-mode scanner 100 further comprises a control module 75, which is electrically connected to the first scanning unit 51, the second scanning unit 52, the third scanning unit 56 and the transporting mechanism 60, and controls the first scanning unit 51 and the third scanning unit 56 to scan the front side of the first portion D1 of the angled document D concurrently or in a scan pass. Thus, the visible light image and the infrared or ultra-violet light image may be obtained, so that the truth or false determination can be performed according to the infrared or ultra-violet light image. In another embodiment, the control module 75 controls the transporting mechanism 60 to transport the angled document D from a first side (near the user) to a second side (away from the user), and controls the first scanning unit 51 to scan the first portion D1 of the angled document D with the visible light, and then the control module 75 controls the transporting mechanism 60 to transport the angled document D from the second side to the first side, and controls the third scanning unit 56 to scan the first portion D1 of the angled document D with the infrared or ultra-violet light. The order of the visible light scan and the infrared/ultra-violet light scan can be modified according to the requirement. Thus, the interference, caused by the visible light and infrared/ultra-violet light working concurrently, can be avoided, and the signal processing may also become easier. That is, the control module 75 controls the visible light scanning unit 51 and the infrared or ultra-violet light scanning unit 56 to scan the first portion D1 of the angled document D, transported by the transporting mechanism 60 in reverse directions, respectively. In this embodiment, the user needs not to stretch his/her hand to the second side, and can easily obtain the scan image and take back the angled document D by only placing the angled document D at the closest first side. In addition, the multi-mode scanner 100 may further comprise a wireless transceiver module 76, electrically connected to the control module 75, for transmitting the scan image signal to a server or a cloud database. Furthermore, the multi-mode scanner 100 may further comprise a document detector 68, disposed beside the first passageway 30 and electrically connected to the control module 75. Upon detection of the angled document D, the control module 75 enables the transporting mechanism 60 to automatically feed the angled document D into the first passageway 30 so that the scan can be performed.

It is to be noted that the multi-mode scanner of the present invention is not restricted to only the scan of the angled document. An ordinary document with a suitable size may also be placed on the first plane P1 and scanned by the multi-mode scanner of the present invention. The user can adjust the width-adjustable guide plate 70 to a suitable width so that the documents with different sizes can be placed and scanned.

Figure 6:
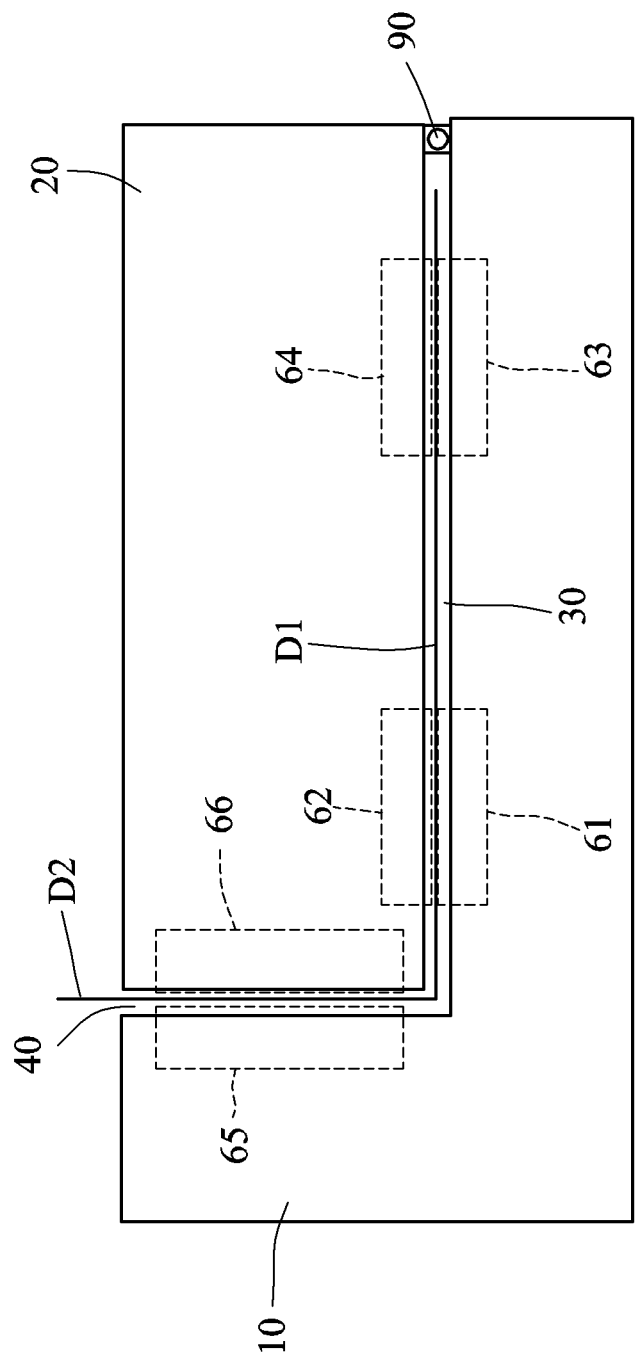
FIG. 6 shows a schematic side view of a multi-mode scanner according to a third embodiment of the present invention.

FIG. 6 shows a schematic side view of a multi-mode scanner according to a third embodiment of the present invention. As shown in FIG. 6, this embodiment is similar to the first embodiment except that rollers 65 and 66 for transporting the second portion D2 of the angled document D are also disposed on the second passageway 40. Thus, the angled document can be transported more stably. It is to be noted that the rollers 61 to 64 may also be omitted in this embodiment, and the effect of transporting the angled document D still can be obtained.

Figure 7:
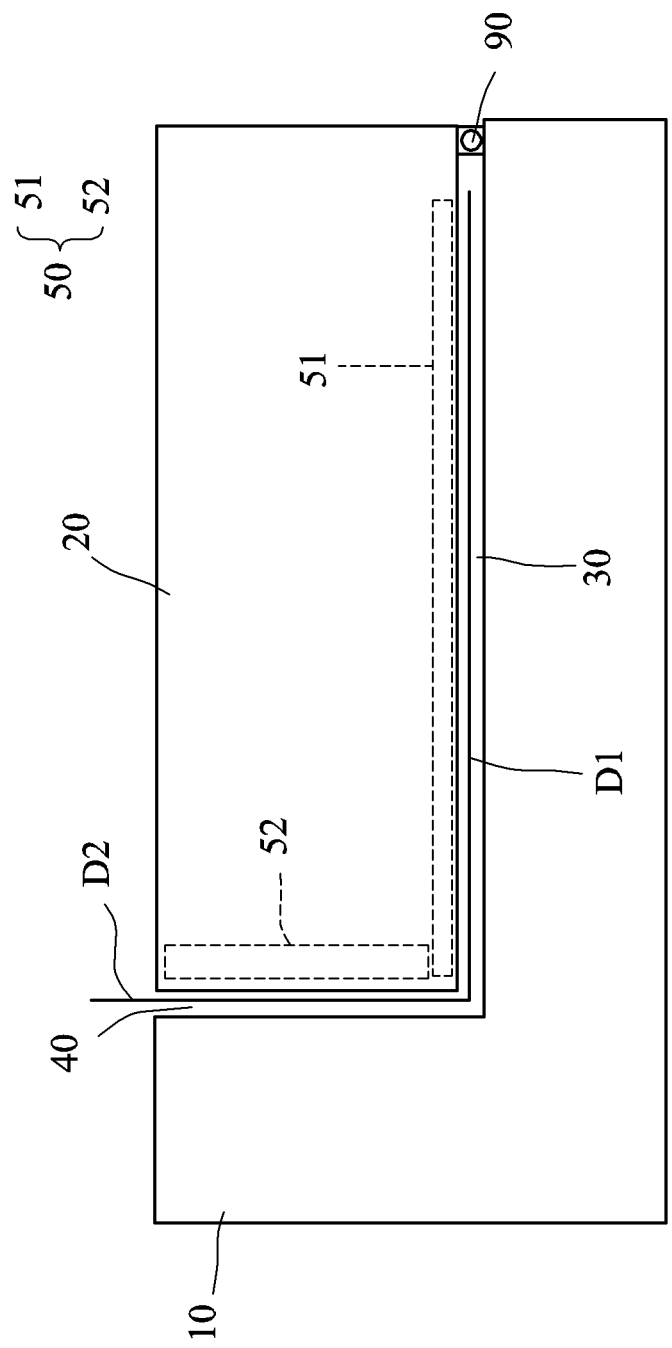
FIG. 7 shows a schematic side view of a multi-mode scanner according to a fourth embodiment of the present invention.

FIG. 7 shows a schematic side view of a multi-mode scanner according to a fourth embodiment of the present invention. As shown in FIG. 7, this embodiment is similar to the first embodiment except that the first scanning unit 51 and the second scanning unit 52 for scanning the first portion D1 and the second portion D2 of the angled document D, respectively, are disposed in the second body 20. Thus, two pages of the angled document D can be scanned at the same time rapidly.

Figure 8:
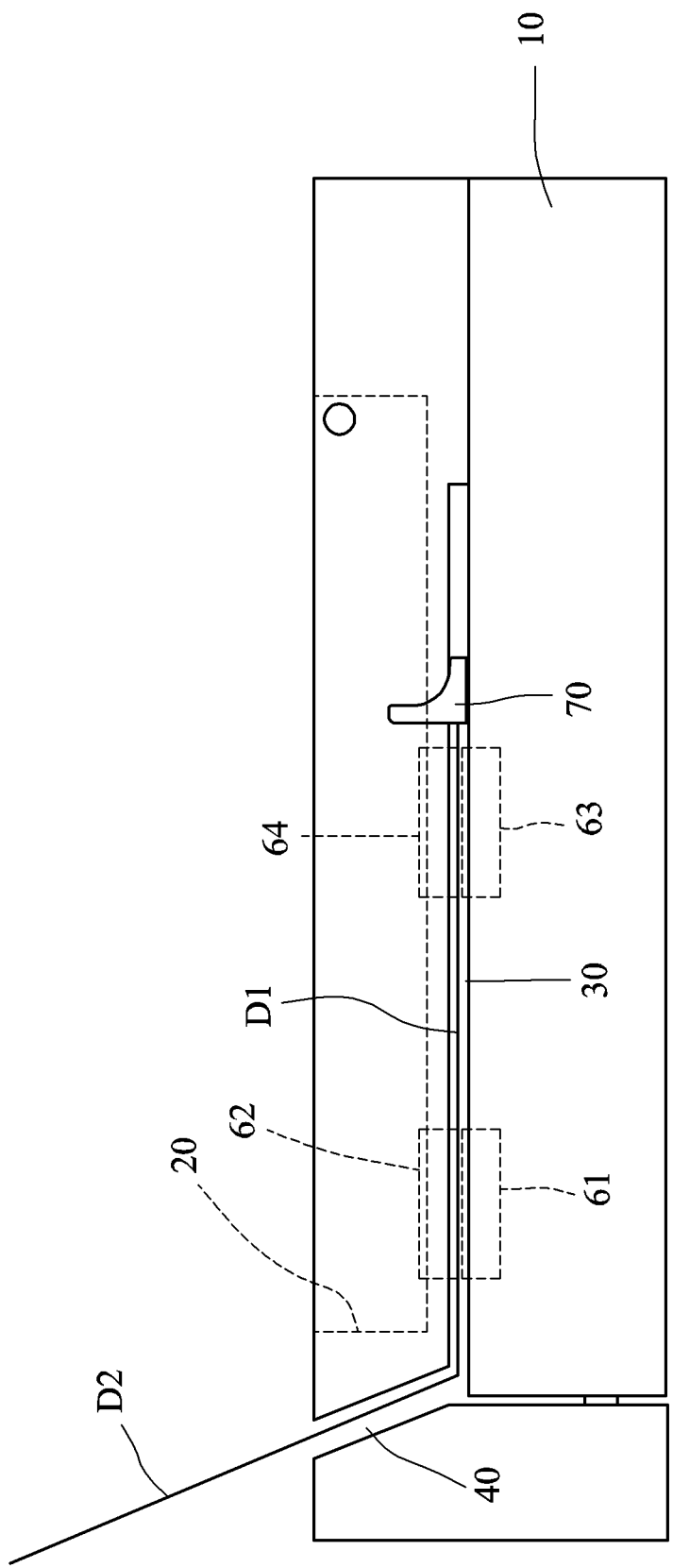
FIG. 8 shows a schematic side view of a multi-mode scanner according to a fifth embodiment of the present invention.

FIG. 8 shows a schematic side view of a multi-mode scanner according to a fifth embodiment of the present invention. As shown in FIG. 8, this embodiment is similar to the first embodiment except that the included angle between the first passageway 30 and the second passageway 40 is greater than 90 degrees. Thus, the effect the same as the first embodiment may also be obtained.

Figure 9:
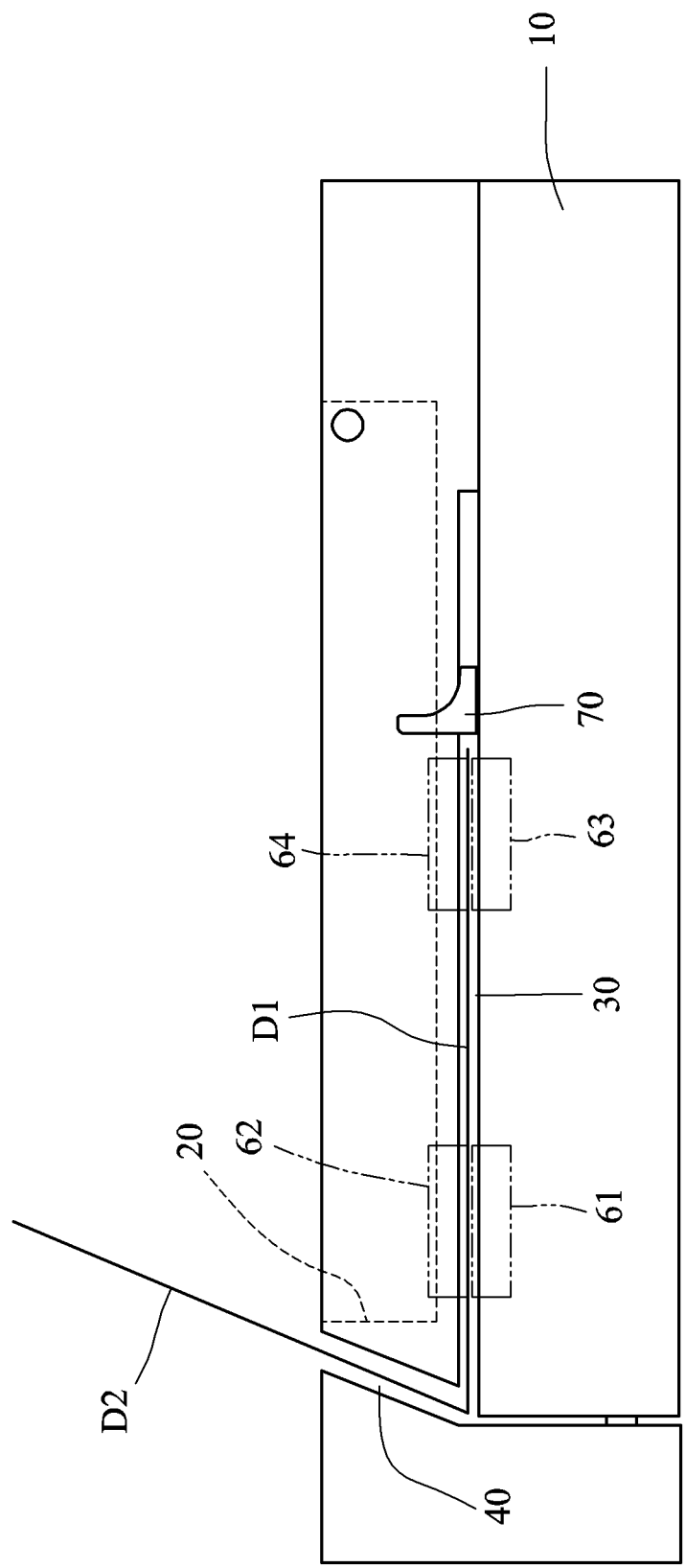
FIG. 9 shows a schematic side view of a multi-mode scanner according to a sixth embodiment of the present invention.

FIG. 9 shows a schematic side view of a multi-mode scanner according to a sixth embodiment of the present invention. As shown in FIG. 9, this embodiment is similar to the first embodiment except that the included angle between the first passageway 30 and the second passageway 40 is smaller than 90 degrees. Thus, the effect the same as the first embodiment may also be obtained. In addition, it is more convenient to scan the angled document, which cannot be easily opened to have an included angle of 90 degrees.

Figure 10:
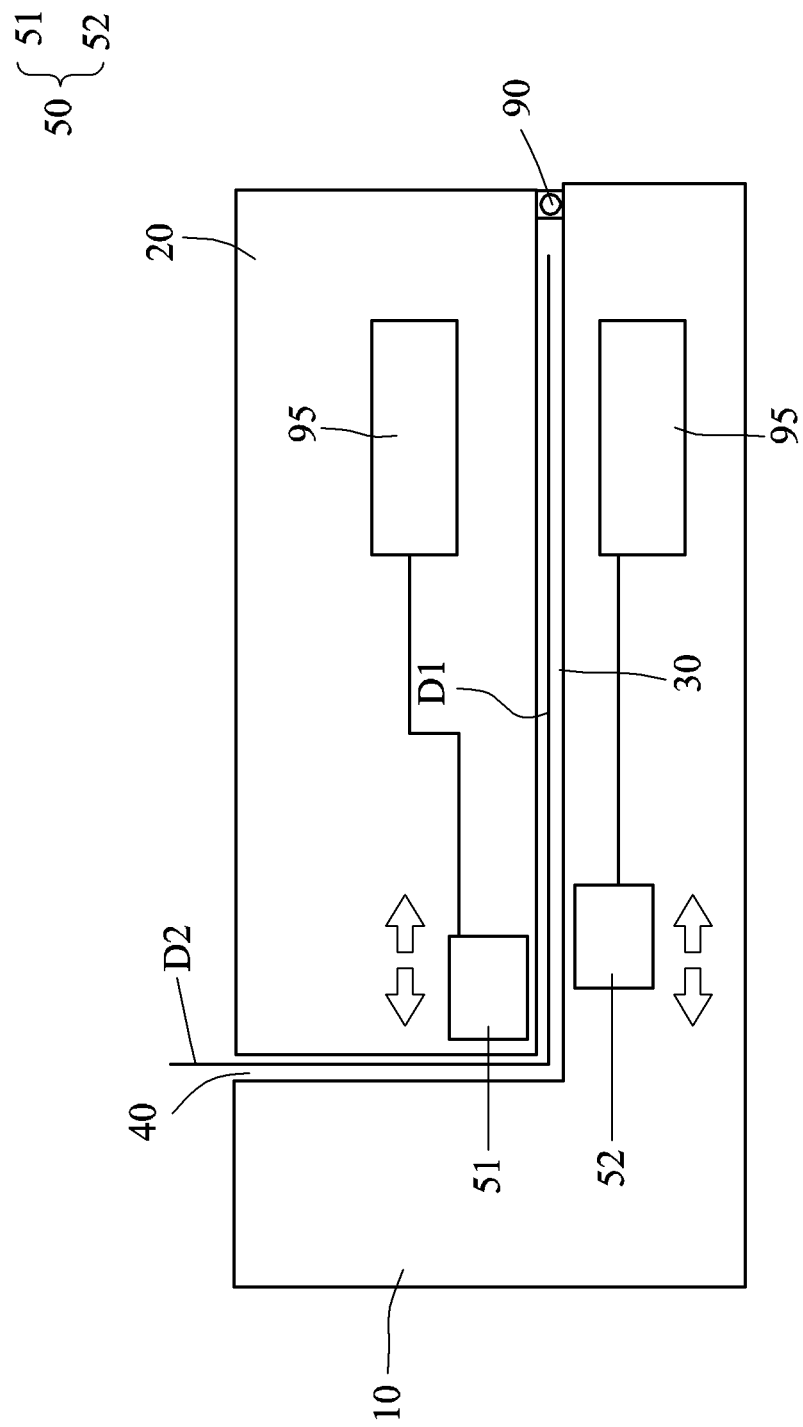
FIG. 10 shows a schematic side view of a multi-mode scanner according to a seventh embodiment of the present invention.

FIG. 10 shows a schematic side view of a multi-mode scanner according to a seventh embodiment of the present invention. As shown in FIG. 10, this embodiment is similar to the first embodiment except that the multi-mode scanner of this embodiment is a flatbed scanner, wherein the multi-mode scanner further comprises a driving mechanism 95, which is connected to the scanning module 50 and drives the scanning module 50 to move back and forth to scan the first portion D1 of the angled document D. In addition, the first scanning unit 51 and the second scanning unit 52 of the scanning module 50 are disposed in the second body 20 and the first body 10, respectively, to downwardly and upwardly scan the front side and the back side of the first portion D1 of the angled document D, respectively.

The multi-mode scanner of each of the above-mentioned embodiments of the present invention is different from frequently seen flatbed scanners and sheet-fed scanners, can transport the bound document having two page sides with different thicknesses and perform the simplex or even duplex scan on the bound document, and can perform the simplex/duplex scan on the ordinary document. The operation is simple, timesaving, laborsaving and user friendly, the cost of purchasing different types of scanners can be saved, the space can be saved, and the multiple purposes can be obtained. In addition, it is unnecessary to flatten the bound document or the angled document or even unnecessary to deform these documents in the scan operation. The user can perform the image scan using his/her single hand to place the document. Because the scanning module can be disposed as close to the second passageway as possible, the zero margin can be obtained so that the scan range is enlarged and the scan result near the angled portion is clear. Furthermore, the limit devices are provided on left and right sides of the document, so that the scanned document can be positioned more easily, and the usage is clear and simple. In addition, when the bound document, such as passport, is scanned, the passport stands in an L-shaped manner, and the rollers transport the passport to perform the scan. This is easier and more laborsaving than turning over and flattening the passport on the scan platen. In addition, when the multi-mode scanner is configured as a passport dedicated scanner, the overall size is smaller than that of the typical flatbed scanner, and the weight is also decreased, so that the scanner can be made portable.

Figure 11:
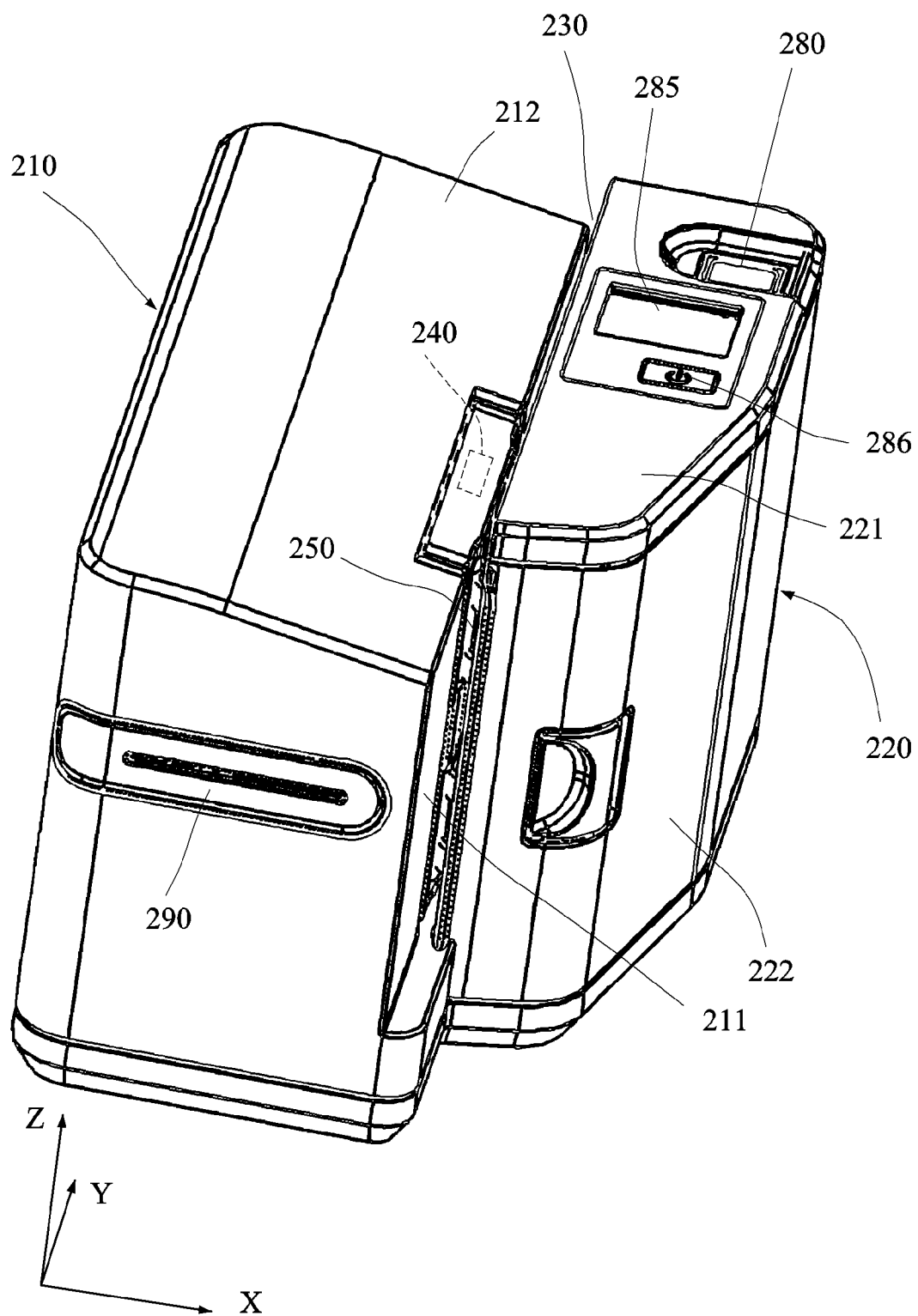
FIG. 11 shows a pictorial view of a multi-mode scanner according to an eighth embodiment of the present invention.
Figure 12:
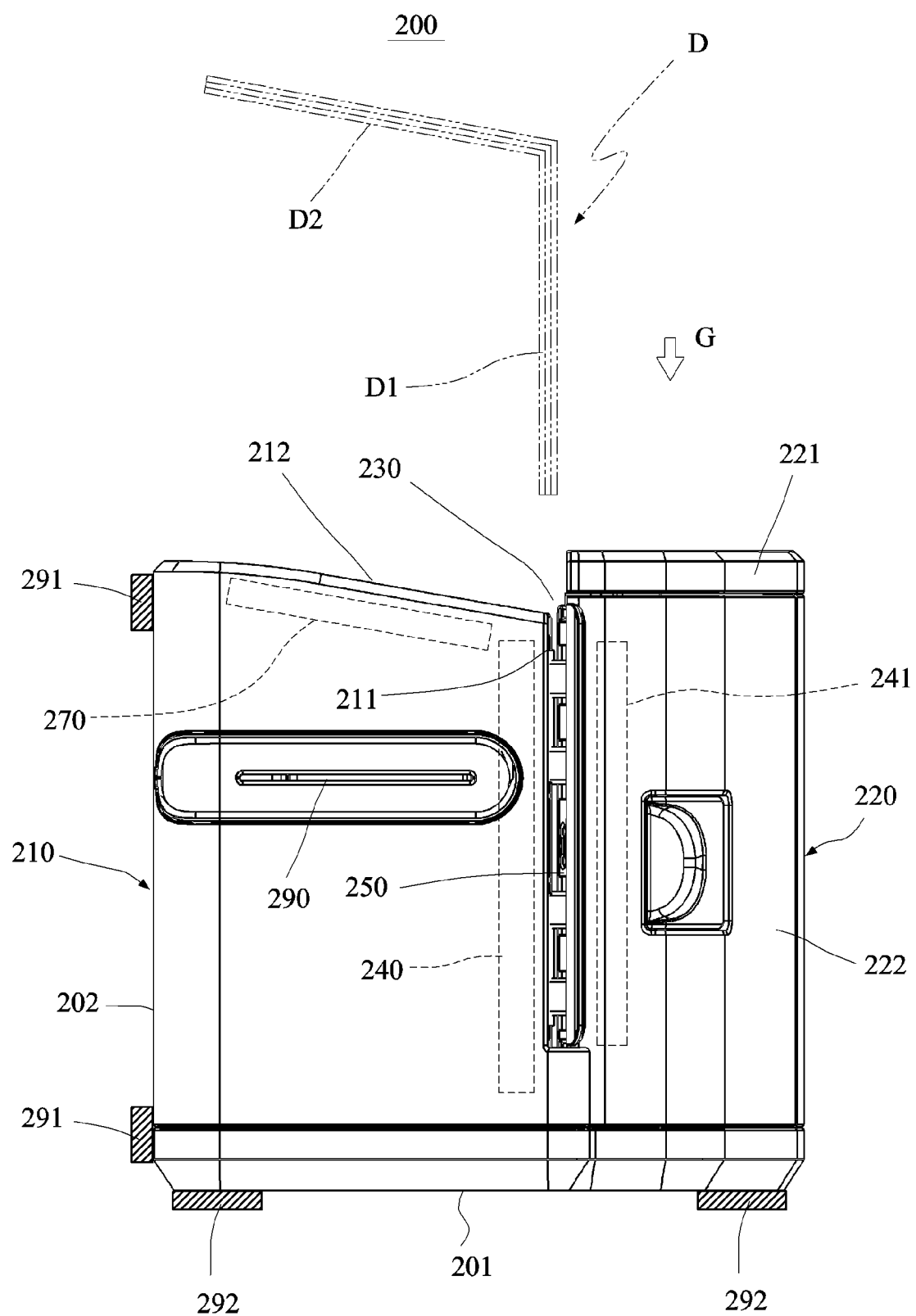
FIG. 12 shows a front view of a first mode of the multi-mode scanner according to the eighth embodiment of the present invention.
Figure 13:
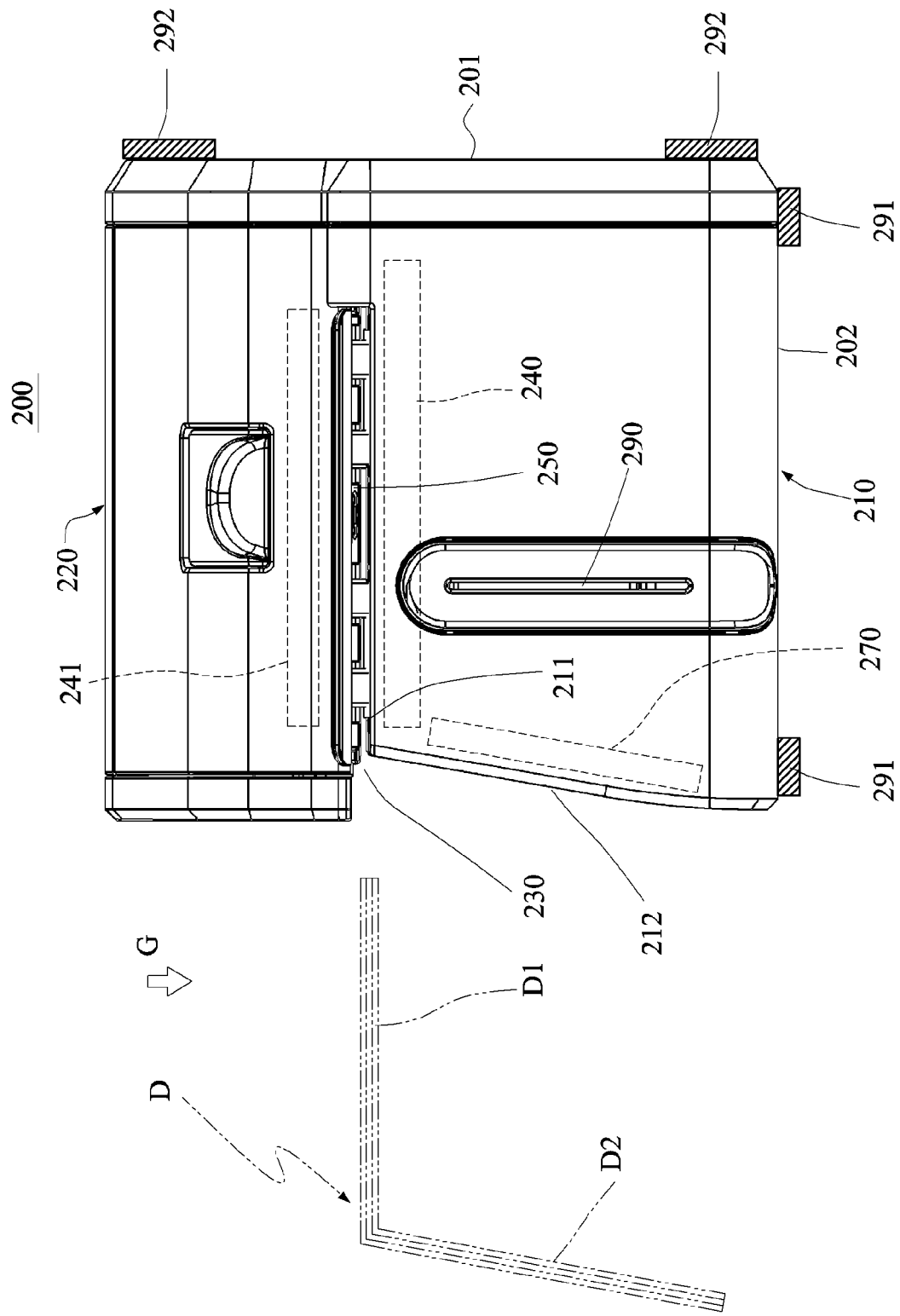
FIG. 13 shows a front view of a second mode of the multi-mode scanner according to the eighth embodiment of the present invention.

FIGS. 11 to 13 show a pictorial view, a front view of a first mode and a front view of a second mode of a multi-mode scanner 200 according to an eighth embodiment of the present invention, respectively. FIG. 11 shows coordinate axes X, Y and Z. Referring to FIGS. 11 to 13, the multi-mode scanner 200 of this embodiment comprises a first body 210, a second body 220 and scanning modules 240 and 241. In addition, the multi-mode scanner 200 may further comprise a transporting mechanism 250, a control module 260 (see FIG. 18), a radio frequency identification (RFID) reader 270, a fingerprint sensor 280, a display 285 and a card reader 290.

The first body 210 has a first side 211 and a second side 212 connected together. Each of the first side 211 and the second side 212 may be constituted by one single flat surface/curved surface, or multiple flat surfaces/curved surfaces. The first body 210 is usually a base or a casing, in which the necessary mechanisms, drive members, electrical elements and the like are disposed.

Similarly, the second body 220 is usually a base or a casing, in which the necessary mechanisms, drive members, electrical elements and the like are disposed. For example, a button 286 is disposed on the second body 220, and the booting operation and/or the scanning operation can be performed after the user presses the button 286.

The second body 220 is connected to the first body 210. A passageway 230 for accommodating a first portion D1 of a bent document D is formed between the first body 210 and the second body 220. A second portion D2 of the bent document D is connected to the first portion D1 of the bent document D, and supported by the second side 212 of the first body 210. The first body 210 and second body 220 are arranged or configured such that a weight G of the bent document D (a gravity force exerted on the bent document D) makes the second portion D2 be in flat surface contact with the second side 212 (FIG. 12), or makes the first portion D1 be in flat surface contact with the first side 211 (FIG. 13).

In this embodiment, the scanning module 240 is disposed in the first body 210, and the scanning module 241 is disposed in the second body 220. The scanning module 241 is disposed in the second body 220 and scans the first portion D1 of the bent document D. Thus, the scanning modules 240 and 241 are disposed in the second body 220 and the first body 210, and scan a reverse side and a front side of the first portion D1 of the bent document D, respectively. However, it is worth noting that in other embodiments of the present invention, the scanning module may be individually disposed in the first body 210 or the second body 220.

Thus, the scanning modules 240 and 241 may be disposed in one or both of the first body 210 and the second body 220, and performs image scan operations on the first portion D1 of the bent document D in the passageway 230 to obtain an image signal. The scanning module may be a charge-coupled device (CCD) type image sensor scanning module, or a contact image sensor (CIS) scanning module. The scanning modules 240 and 241 may be visible light scanning modules, ultra-violet scanning modules or infrared scanning modules.

In a non-restrictive embodiment, an included angle between the first side 211 and the second side 212 is about 100 degrees. In another example, the included angle ranges from 10 to 170 degrees. In still another example, the included angle ranges from 20 to 160 degrees. In yet still another example, the included angle ranges from 30 to 150 degrees. Although the passageway 230 is disposed in an orientation parallel to the YZ plane. In another example, however, the passageway 230 may also be not parallel to the YZ plane.

The bent document D is transported past the scanning modules 240 and 241 in the Y direction motion, and the primary to-be-scanned surface (the surface with the texts or patterns) of the bent document D faces the negative X direction. The bent document D may also have a secondary to-be-scanned surface facing the positive X direction. The bent document D comprises, for example but without limitation to, a bound document, a bent card or the like.

The transporting mechanism 250 is disposed in the first body 210 and the second body 220, and transports the bent document D past the passageway 230 with the document D being kept bent. In this embodiment, rollers function as the transporting mechanism.

The RFID reader 270 disposed in the first body 210 reads RFID information of the bent document D to provide the security function. In other examples, the RFID reader 270 may also be disposed in the second body 220, or disposed in both the first body 210 and the second body 220. The fingerprint sensor 280 disposed on the first body 210 or the second body 220 reads a fingerprint. The card reader 290 disposed on the first body 210 or the second body 220 reads a chip card or a memory card.

In addition, the scanner 200 may further comprise buffer pads 291 and 292, which are disposed on two neighboring sides 201 and 202 of the scanner, and support the weight of the scanner in two modes, respectively. That is, the buffer pad 292 in FIG. 12 supports the weight of the scanner 200 in an upright mode; and the buffer pad 291 in FIG. 13 supports the weight of the scanner 200 in a lying mode. The buffer pads 291 and 292 may be integrated with the two sides 201 and 202 to keep the beauty.

Figure 14:
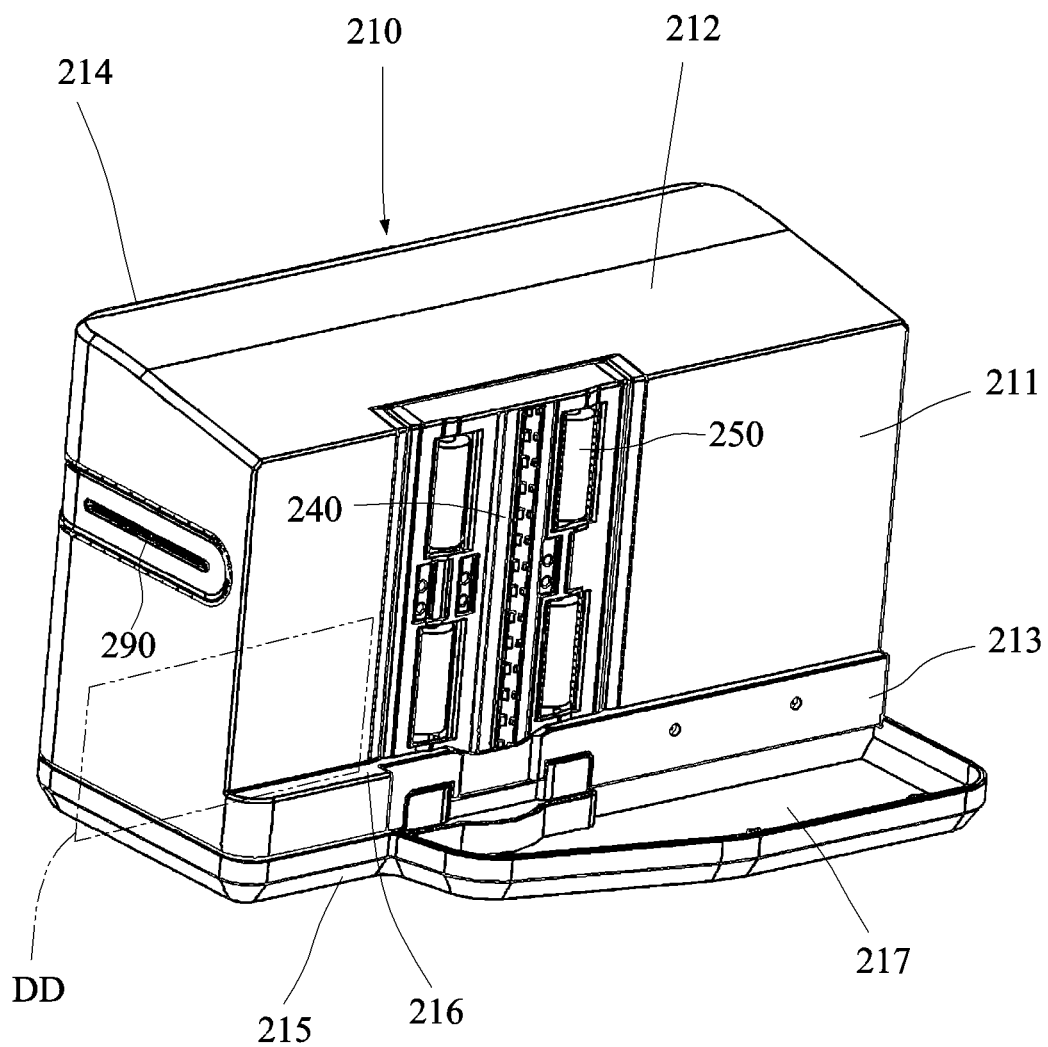
FIG. 14 shows a pictorial view of a first body of the multi-mode scanner of FIG. 11.
Figure 15:
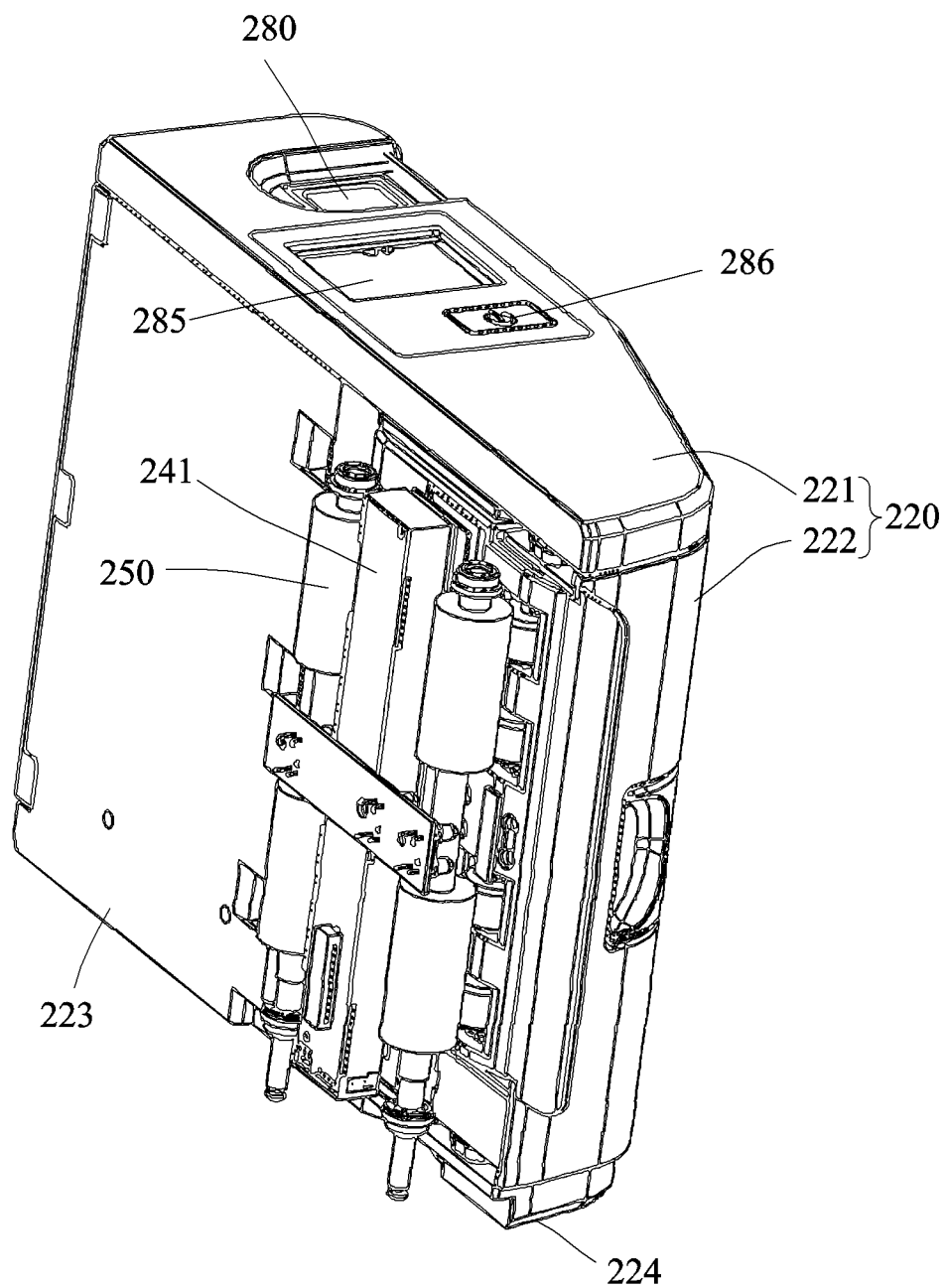
FIG. 15 shows a pictorial view of a second body of the multi-mode scanner of FIG. 11.

FIG. 14 shows a pictorial view of a first body 210 of the multi-mode scanner of FIG. 11. FIG. 15 shows a pictorial view of a second body 220 of the multi-mode scanner of FIG. 11. Referring to FIGS. 14 and 15, a mounting surface 223 of the second body 220 is mounted on a mounting surface 213 of the first body 210, and a mounting surface 224 of the second body 220 is mounted on a mounting surface 217 of the first body 210. The first body 210 is constituted by a main body 214 and a base 215, both of which may be separated or integrally formed jointly with each other. When the multi-mode scanner 200 scans the non-bent document DD, the non-bent document DD may rest against a stopper wall 216 of the first body 210 and is thus positioned. The non-bent document DD may be scanned vertically (FIG. 12) or horizontally (FIG. 13).

Figure 16:
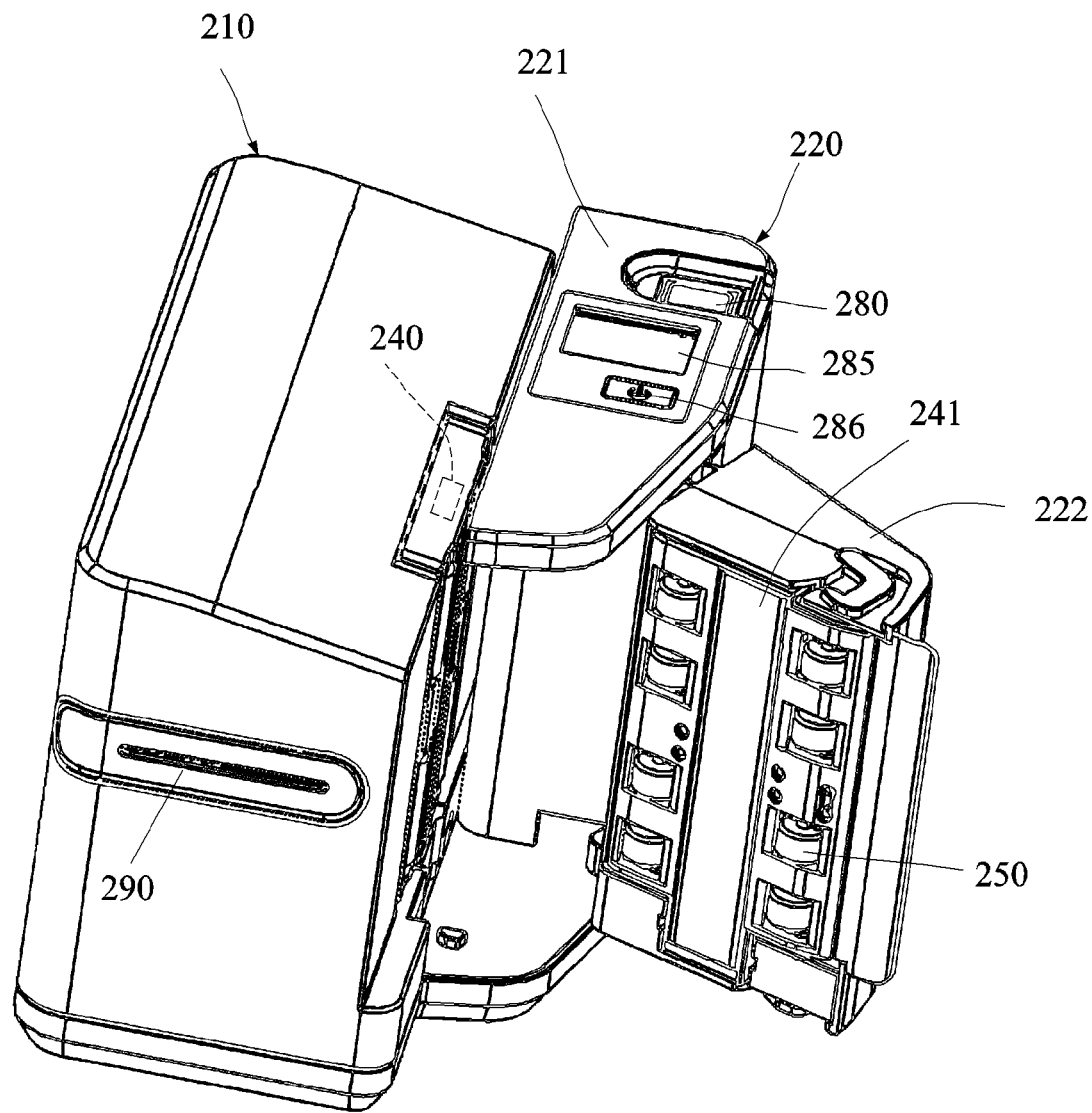
FIG. 16 shows a pictorial view of a maintenance state of the multi-mode scanner according to the eighth embodiment of the present invention.

FIG. 16 shows a pictorial view of a maintenance state of the multi-mode scanner according to the eighth embodiment of the present invention. Referring to FIGS. 15 and 16, the second body 220 comprises a base 221 and a cover 222. The base 221 is connected to the first body 210. The cover 222 is pivotally connected to the base 221. The scanning modules 240 and 241 and the transporting mechanism 250 are disposed on the cover 222 of the second body 220. The cover 222 may be opened so that the user can perform cleaning or maintaining works.

Figure 17:
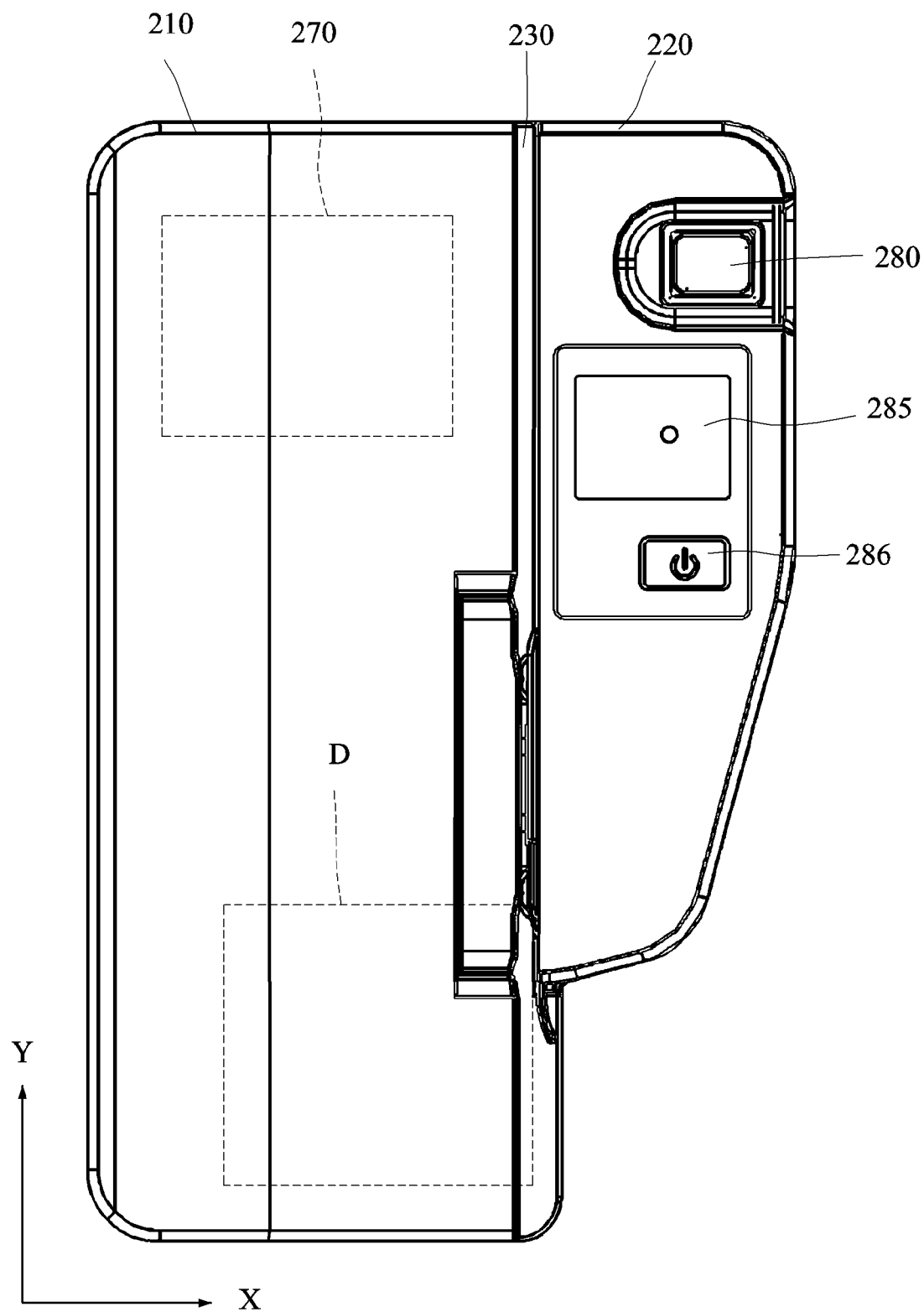
FIG. 17 shows a top view of the multi-mode scanner according to the eighth embodiment of the present invention.
Figure 18:
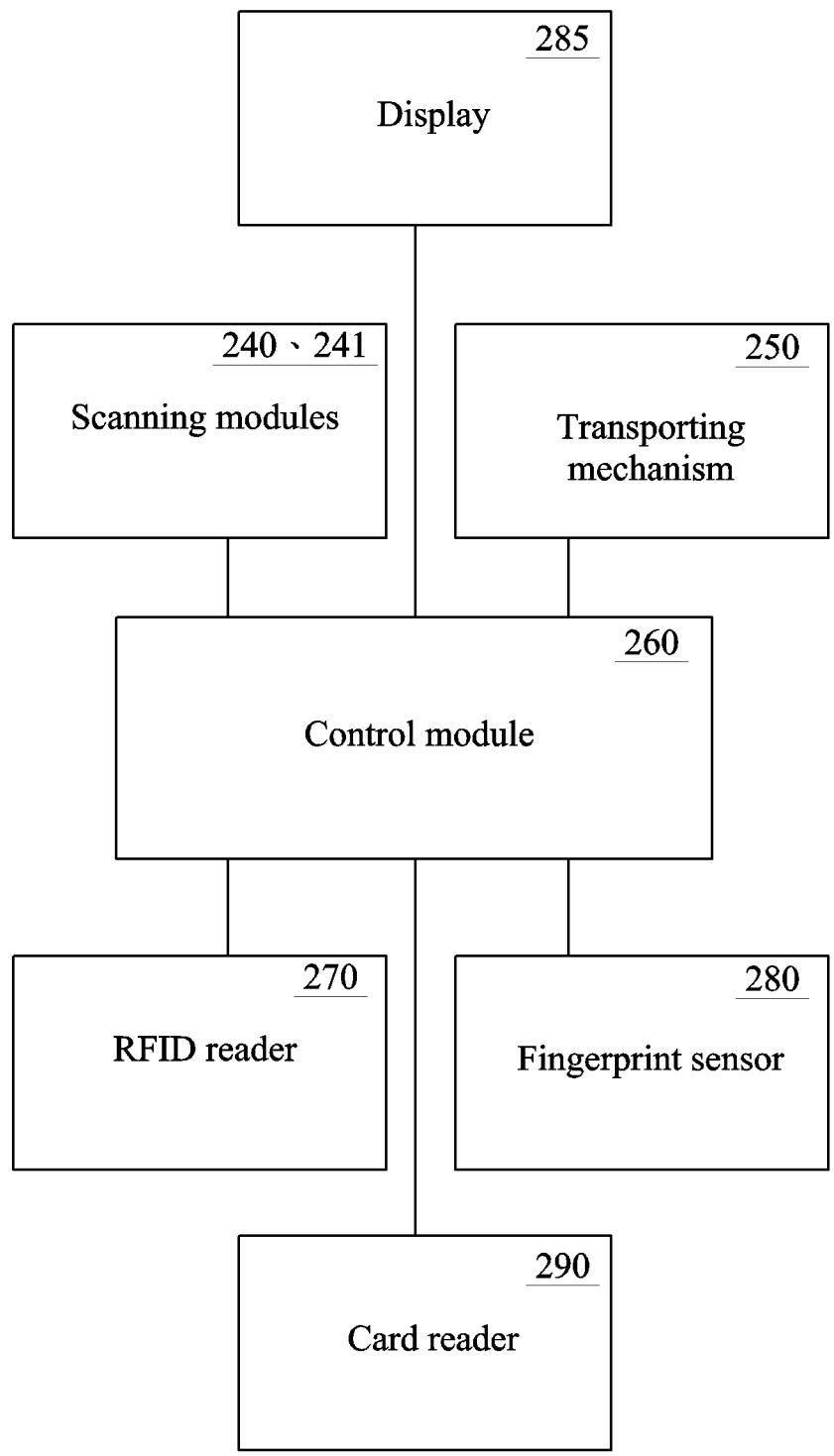
FIG. 18 shows a functional block diagram of the multi-mode scanner according to the eighth embodiment of the present invention.

FIG. 17 shows a top view of the multi-mode scanner according to the eighth embodiment of the present invention. FIG. 18 shows a functional block diagram of the multi-mode scanner according to the eighth embodiment of the present invention. As shown in FIGS. 12, 17 and 18, the control module 260 is electrically connected to the scanning modules 240 and 241, the transporting mechanism 250, the control module 260, the RFID reader 270, the fingerprint sensor 280, the display 285 and the card reader 290.

In one example, the control module 260 controls the scanning modules 240 and 241 to scan the first portion D1 of the bent document D concurrently or in one scan operation. The scan timing may be the timing when the bent document D is transported in the positive or negative Y direction.

In another example, the control module 260 controls the scanning modules 240 and 241 to scan the front side and the reverse side of the first portion D1 of the bent document D transported by the transporting mechanism 250 in the opposite directions. For example, when the bent document D is transported in the positive Y direction, the scanning module 240 scans the front side of the first portion D1; and when the bent document D is transported in the negative Y direction, the scanning module 240 scans the reverse side of the first portion D1.

In still another example, the control module 260 controls the scanning modules 240 and 241 to perform the image scan operation(s) when the fingerprint sensor 280 successfully reads the fingerprint. The image signals obtained by the scanning modules 240 and 241 may be stored in the chip card or the memory card through the card reader 290. Alternatively, the control module 260 compares the read fingerprint with the information or RFID information stored in the chip card, the memory card or the RFID reader 270, and then controls the scanning module to perform the scan operation after the comparison passes.

With the multi-mode scanner according to the embodiment of the present invention, which is different from the frequently seen flatbed scanner and sheet-fed scanner, either the bent document or the ordinary document can be automatically transported and scanned (simplex and duplex scans can be performed). So, the operation becomes easy, timesaving, laborsaving and user friendly. In addition, the fingerprint identification, RFID and chip card reading functions are obtained. Furthermore, the cost of purchasing different types of electronic devices can be saved, the space can be saved, and the objects of the multi-mode operation, the security function, the identification and the data storage can be achieved.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A multi-mode scanner, comprising:
    a first body having a first side and a second side connected together;
    a second body connected to the first body, wherein a passageway for accommodating a first portion of a bent document is formed between the first body and the second body, a second portion of the bent document is connected to the first portion of the bent document and is supported by the second side of the first body, and the first body and the second body are configured such that a weight of the bent document makes the second portion be in flat surface contact with the second side, or makes the first portion be in flat surface contact with the first side; and
    a scanning module, which is disposed in one or both of the first body and the second body and performs an image scan operation on the first portion of the bent document in the passageway to obtain an image signal.

2. The multi-mode scanner according to claim 1, further comprising:
    a transporting mechanism, which is disposed in the first body and the second body and transports the bent document past the passageway.

3. The multi-mode scanner according to claim 2, wherein the scanning module is disposed in the second body and scans the first portion of the bent document.

4. The multi-mode scanner according to claim 2, wherein the scanning module is disposed in the second body and the first body, and scans a reverse side and a front side of the first portion of the bent document.

5. The multi-mode scanner according to claim 2, wherein the second body comprises:
    a base connected to the first body; and
    a cover pivotally connected to the base, wherein the scanning module and the transporting mechanism are disposed on the cover of the second body.

6. The multi-mode scanner according to claim 2, further comprising a control module, which is electrically connected to the transporting mechanism and the scanning module, and controls the scanning module to scan the first portion of the bent document concurrently.

7. The multi-mode scanner according to claim 2, further comprising a control module, which is electrically connected to the scanning module and the transporting mechanism, and controls the scanning module to scan a front side and a reverse side of the first portion of the bent document, which are transported by the transporting mechanism in opposite directions.

8. The multi-mode scanner according to claim 1, further comprising a radio frequency identification reader, which is disposed in the first body and reads radio frequency identification information of the bent document.

9. The multi-mode scanner according to claim 1, further comprising a fingerprint sensor, which is disposed on the first body or the second body and reads a fingerprint.

10. The multi-mode scanner according to claim 9, further comprising a control module electrically connected to the fingerprint sensor and the scanning module, wherein the control module controls the scanning module to perform the image scan operation when the fingerprint sensor successfully reads the fingerprint.

11. The multi-mode scanner according to claim 1, further comprising a card reader, which is disposed on the first body or the second body and reads a chip card or a memory card.

12. The multi-mode scanner according to claim 1, further comprising buffer pads, which are disposed on two neighboring sides of the multi-mode scanner, and support a weight of the multi-mode scanner in two modes.

* * * * *